US012798428B2

(12) United States Patent
Abe

(10) Patent No.: US 12,798,428 B2
(45) Date of Patent: Nov. 17, 2026

(54) DELAY OF A NETWORK BETWEEN PLURALITY OF CHARGING STATIONS RELATED TO THE PROCESS REQUESTED FROM A VEHICLE

(71) Applicant: TOYOTA JIDOSHA KABUSHIKI KAISHA, Toyota (JP)

(72) Inventor: Hiroshi Abe, Kasukabe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 596 days.

(21) Appl. No.: 18/381,202

(22) Filed: Oct. 18, 2023

(65) Prior Publication Data

US 2024/0149737 A1 May 9, 2024

(30) Foreign Application Priority Data

Nov. 4, 2022 (JP) ................................ 2022-177302

(51) Int. Cl.
*B60L 53/66* (2019.01)
*B60L 53/63* (2019.01)

(52) U.S. Cl.
CPC ............... *B60L 53/66* (2019.02); *B60L 53/63* (2019.02); *B60L 2240/66* (2013.01)

(58) Field of Classification Search
CPC ...... B60L 53/66; B60L 53/63; B60L 2240/66; B60L 2240/665; B60L 2260/46; B60L 2260/50; B60L 53/51; B60L 53/52; B60L 53/62; B60L 2240/72; B60L 2240/80; B60L 53/67; B60L 53/68; B60L 53/60; B60L 53/30; Y04S 30/12; Y02T 90/12; Y02T 90/167
USPC .......................................................... 320/109
See application file for complete search history.

(56) References Cited

U.S. PATENT DOCUMENTS

| | | | | |
|---|---|---|---|---|
| 2014/0351010 | A1* | 11/2014 | Kong | G05F 1/66 705/7.29 |
| 2015/0015419 | A1* | 1/2015 | Halker | B60L 53/305 320/108 |
| 2018/0065494 | A1* | 3/2018 | Mastrandrea | B60L 53/14 |
| 2019/0160958 | A1* | 5/2019 | Chaudhary | B60L 53/665 |
| 2019/0315245 | A1 | 10/2019 | Kinomura | |
| 2020/0101859 | A1* | 4/2020 | Baxter | B60L 3/0084 |

FOREIGN PATENT DOCUMENTS

| | | |
|---|---|---|
| JP | 2019-186814 A | 10/2019 |
| JP | 2021-189845 A | 12/2021 |

* cited by examiner

*Primary Examiner* — Huy Q Phan
(74) *Attorney, Agent, or Firm* — Dinsmore & Shohl LLP

(57) ABSTRACT

There is provided a controller configured to: determine, among a plurality of charging stations, a second charging station which is a charging station in which the process requested from a vehicle is completed during a charging period of the vehicle, and in which an excess power in a plurality of power generation facilities is smaller than that in a case where a process requested from the vehicle is performed in a first charging station, based on information related to the process requested from the vehicle, information related to an amount of power generation, and information related to a delay of the network; and instruct the first charging station to transmit information related to the process requested from the vehicle to the second charging station.

5 Claims, 5 Drawing Sheets

DELAY OF A NETWORK BETWEEN PLURALITY OF CHARGING STATIONS RELATED TO THE PROCESS REQUESTED FROM A VEHICLE

CROSS REFERENCE TO THE RELATED APPLICATION

This application claims the benefit of Japanese Patent Application No. 2022-177302, filed on Nov. 4, 2022, which is hereby incorporated by reference herein in its entirety. reference herein in its entirety.

BACKGROUND

Technical Field

This disclosure relates to information processing apparatus.

Description of the Related Art

Charging stations configured to provide network connectivity to vehicles via wireless communication have been proposed (see, for example, Patent Literature 1). It is also known to efficiently utilize renewable energy in a data center system consisting of multiple data centers (see, for example, Patent Literature 2).

CITATION LIST

Patent Literature

Patent Literature 1: JP 2019-186814
Patent Literature 2: JP 2021-189845

SUMMARY

The purpose of the present disclosure is to efficiently use renewable energy at vehicle charging stations.

One aspect of the present disclosure is directed to an information processing apparatus including a controller configured to:

- acquire information related to a process requested from a vehicle to be charged at a first charging station among a plurality of charging stations;
- acquire information related to an amount of power generation using renewable energy in a plurality of power generation facilities assigned to the plurality of charging stations;
- acquire information related to a delay of a network between the plurality of charging stations,
- determine, among the plurality of charging stations, a second charging station which is a charging station in which the process requested from the vehicle is completed during a charging period of the vehicle, and in which an excess power in the plurality of power generation facilities is smaller than that in a case where the process requested from the vehicle is performed in the first charging station, based on information related to the process requested from the vehicle, information related to an amount of power generation, and information related to the delay of the network; and
- instruct the first charging station to transmit information related to the process requested from the vehicle to the second charging station.

Further, another aspect of the present disclosure is an information processing method in which a computer executes processing in the information processing apparatus, a program for causing the computer to execute the processing in the information processing apparatus, and a storage medium storing the program in a non-transitory manner.

According to this disclosure, renewable energy can be used efficiently at vehicle charging stations.

DESCRIPTION OF THE EMBODIMENTS

Figure 1:
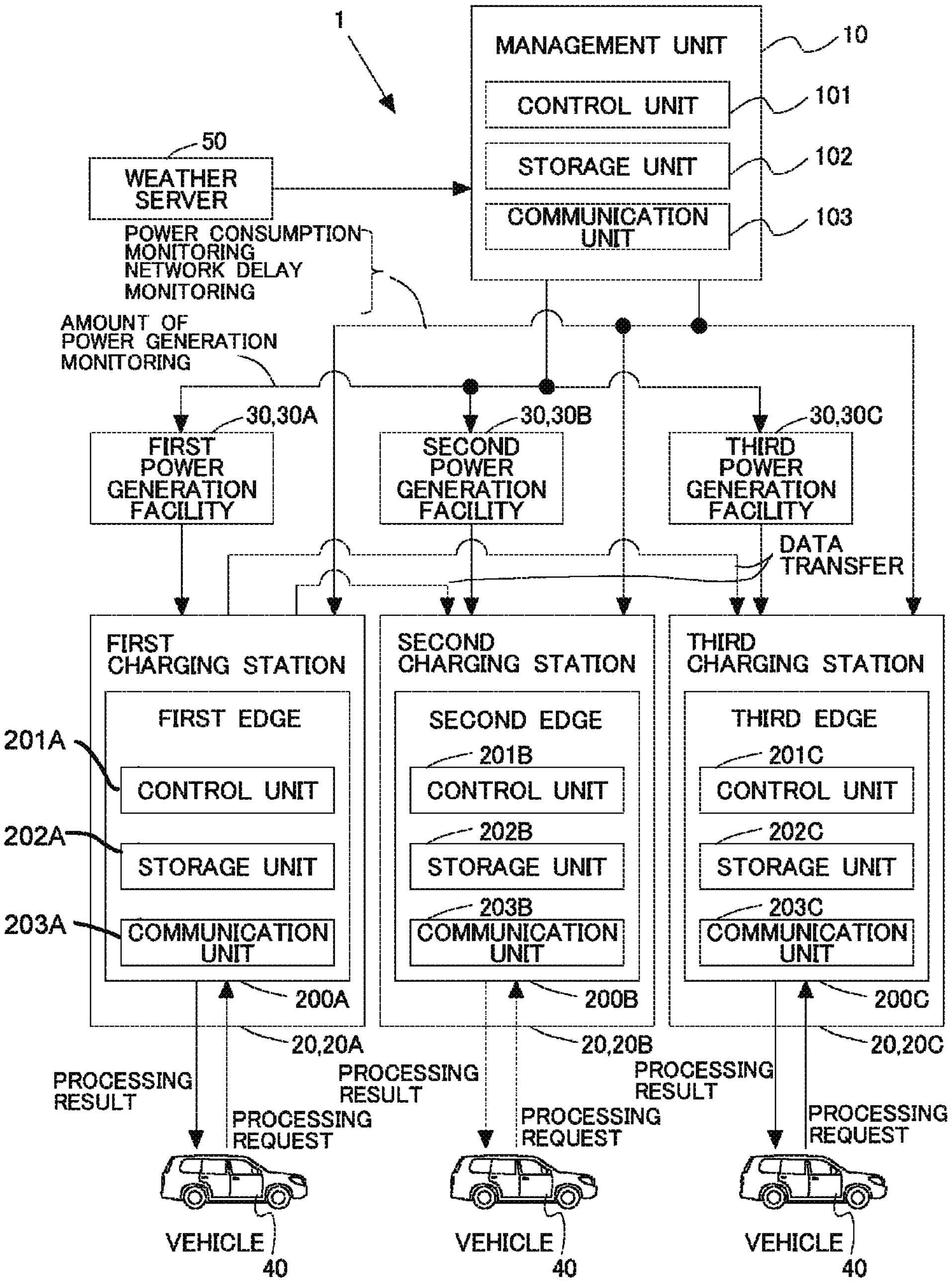
FIG. 1 shows the schematic diagram of the information processing apparatus.

At charging stations that charge vehicles, there are known services that perform information processing in response to requests from vehicles. These vehicles include a Battery Electric Vehicle (BEV) and a Plug-in Hybrid Electric Vehicle (PHEV). For example, ECU firmware updates using OTA (Over The Air), software updates installed in the vehicle, uploading of data stored in the vehicle (image data, video data, CAN data), downloading video data or music data, updating map data, and developing high-resolution information in the current location (e.g., Point of Interest) can be requested from the charging station.

The charging stations of the present disclosure are supplied with green power from power generation facilities that use renewable energy (which may also be natural energy) to generate electricity. Here, green power may be disposed of when a surplus is generated. On the other hand, in such the power generation facility, the amount of power generated may be affected by the weather, so there may be a shortage of electricity.

Conventional technologies have attempted to efficiently use renewable energy in systems consisting of multiple data centers. Such technology is designed to perform information processing at all times and cannot be applied directly to vehicle charging stations. For example, vehicle charging stations need to complete information processing while the vehicle is charging. Therefore, for example, if there is a large network delay, the process may not be completed in time.

In addition, conventional systems are designed to ignore storage power consumption in the huge facility that is the data center. Furthermore, there is an assumption that multiple data centers are relatively close to each other, and no parameters for distance have been set. In addition, a relatively small number of data centers are covered, and optimization cannot be achieved by calculating excess power alone when the order of magnitude of the number of data centers changes.

In order to utilize renewable energy among multiple data centers, these conventional systems propose a mechanism to prioritize processing at data centers that are projected to have a surplus of renewable energy. However, in general, data processed in the data center often processes accumulated data, and there has been no discussion of data movement. Moving huge amounts of data between data centers is impractical because of the high cost of transfer. If only the process is moved and the data is not moved, the moved processing refers to data in the original data center, which consumes extra communication costs and power for storage access. In the case of moving large data, communication costs and storage server processing are similarly performed, so it is not realistic in terms of power consumption. There is no discussion regarding the distance between multiple data centers, and when the physical distance between data centers increases, the network distance also increases. The distance between data centers also has a significant impact on power consumption, as longer distances reduce transfer efficiency.

In contrast, an information processing apparatus, which is one aspect of the present disclosure, is provided with a controller which is configured to acquire information related to a process requested from a vehicle to be charged at a first charging station among a plurality of charging stations, information related to an amount of power generation using renewable energy in a plurality of power generation facilities assigned to the plurality of charging stations, and information related to a delay of a network between the plurality of charging stations. Information related to the process requested from the vehicle includes, for example, information about the amount of processing load amount (which may also be the amount of data) requested by the vehicle, or information about power consumption according to that load amount. Information related to the amount of power generation includes information related to surplus power. Information related to the delay of a network is, for example, information related to the time required when processing requested by the vehicle is performed at another charging station.

The controller also, among the plurality of charging stations, a second charging station which is a charging station in which the process requested from the vehicle is completed during a charging period of the vehicle, and in which an excess power in the plurality of power generation facilities is smaller than that in a case where the process requested from the vehicle is performed in the first charging station, based on information related to the process requested from the vehicle, information related to an amount of power generation, and information related to the delay of the network. The controller then instructs the first charging station to transmit information related to the process requested from the vehicle to the second charging station. This allows the process requested by the vehicle to take place at the second charging station.

For example, information related to the amount of power generation is related to the surplus power at each charging station. Information related to the process requested from the vehicle and information related to the delay of a network will be material in determining whether or not the information processing can be completed during the vehicle's charging period if the data is transferred to another charging station. By proactively processing at the second charging station, where a large amount of excess power is generated and where processing can be completed during the charging period even if data is moved, the processing requested by the vehicle can be completed during the vehicle charging period, while reducing excess power that is discarded.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

EMBODIMENT

FIG. 1 is a diagram illustrating a schematic configuration of an information processing apparatus 1 according to an embodiment. The information processing apparatus 1 includes a management unit 10, a charging station 20, a power generation facility 30, a vehicle 40, and a weather server 50. The information processing apparatus 1 is a system that assigns processes requested by vehicle 40 to each of the charging stations 20 so that the processes requested by vehicle 40 are completed during the vehicle 40 charging period and to reduce excess power at each of the power generation facilities 30. The management unit 10 corresponds to a controller.

The management unit 10, the charging station 20, the power generation facility 30, and the weather server 50 are interconnected by a network. The network is, for example, a global public communication network such as the Internet, and a WAN (Wide Area Network) or other communication networks may be adopted. The network may also include telephone communication networks such as cellular phones, or wireless communication networks such as Wi-Fi (registered trademark). The vehicle 40 and the charging station 20 are connected by a telephone communication network, such as a cellular phone, or a wireless communication network, such as Wi-Fi (registered trademark), for example. The vehicle 40 has a charging port and can be electrically connected to the charging facilities at the charging station 20 to charge the drive battery.

In the example shown in FIG. 1, charging station 20 includes a first charging station 20A, a second charging station 20B, and a third charging station 20C. The number of 20 charging stations is not limited to the three illustrated in FIG. 1. In the following, when the first charging station 20A, second charging station 20B, and third charging station 20C are not distinguished, they are simply referred to as charging station 20. Each of the charging stations 20 receive its power supply from a different power generation facility 30. The power generation facility 30 includes a first power generation facility 30A, a second power generation facility 30B, and a third power generation facility 30C. The first power generation facility 30A, the second power generation facility 30B, and the third power generation facility 30C are assigned to the first charging station 20A, the second charging station 20B, and the third charging station 20C, respectively. In the following, when the first power generation facility 30A, the second power generation facility 30B, and the third power generation facility 30C are not distinguished, they are simply referred to as the power generation facility 30. The power generation facility 30 is a facility for generating power using renewable energy (natural energy), for example, a facility for performing solar power generation, wind power generation, hydroelectric power generation, geothermal power generation, biomass power generation, and the like.

The management unit 10 is a computer that manages the charging stations 20. The management unit 10 can comprise a computer having a processor such as a central processing unit (CPU) or a digital signal processor (DSP), a main storage device such as a random access memory (RAM) or a read only memory (ROM), and a computer having an auxiliary storage device such as an EPROM (Erasable Programmable ROM), a hard disk drive (HDD, Hard Disk Drive), and removable media. The management unit 10 comprises a control unit 101, a storage unit 102, and a communication unit 103.

The control unit 101 of the management unit 10 is an arithmetic unit that controls the control performed by the management unit 10. The control unit 101 can be realized by an arithmetic processor such as a CPU. The control unit 101 obtains information on power consumption from each of the charging stations 20. The power consumption referred to here is the power consumed at each charging station 20 at that time, and includes the power for charging the vehicle 40 and the power for performing the processing requested from the vehicle 40 and already performed.

The control unit 101 also obtains information from each power generation facility 30 regarding the amount of power generated at the present time (which may also be the power supplied to each charging station 20). Alternatively, this information may be obtained from each of the charging stations 20. In the following, information on power consumption at each of the charging stations 20 and power generation at each of the power generation facilities 30 will be referred to collectively as power information.

In addition, the control unit 101 obtains weather information corresponding to the location of each power generation facility 30 from the weather server 50. This weather information includes information on the future generation of electricity at each of the power generation facilities 30. For example, sunny, cloudy, rainy, sunrise time, sunset time, etc. affect solar power generation. Wind speed also affects wind power generation. For example, by obtaining weather forecasts from the weather server 50, information that correlates with future power generation can be obtained.

In addition, the control unit 101 obtains information about network latency. Network latency is measured by mesh measurement using, for example, RTT (Round Trip Time), OWAMP (A One-way Active Measurement Protocol), TWAMP (A Two-way Active Measurement Protocol), etc. The measurement of network delay may be performed at each charging station 20 and the results of the measurement may be sent to the management unit 10.

The control unit 101 also obtains vehicle information from the charging station 20, which is information about the vehicles 40 being charged at the charging station 20. Vehicle information includes data sent from vehicle 40 to charging station 20. Vehicle information includes the vehicle identifier (vehicle ID), remaining battery charge level, target remaining battery charge level, charge completion time, and information about the requested process (information about the content of the process). Vehicle information includes, for example, information transmitted from the vehicle 40 to the charging station 20 at the time the connector for charging is connected to the vehicle 40. The vehicle information transmitted to the management unit 10 may include the load amount of the process required from the vehicles 40 and the power consumption for that load amount. This power consumption according to the load amount may be calculated at the charging station 20 or by the control unit 101. The charge completion time may be calculated by the charging station 20 or by the control unit 101 based on the current time, the remaining charge of the battery, the target remaining charge of the battery, and the power that the charging station 20 can supply per unit time. The charge completion time may be a user-specified time. Further, as a separate method, when quick charging is performed, the time when a certain time (for example, 30 minutes) has elapsed may be used as the charge completion time.

The control unit 101 then determines at which charging station 20 the process requested by the vehicles 40 will be performed based on the weather information, power information, network delay information, and vehicle information. Statistical methods such as regression analysis or machine learning, for example, may be used to determine the charging stations 20 to be processed. At this time, the charging station 20 of the transfer destination is determined so that less green power is discarded and the process is completed during the charging period of the vehicle 40. For example, the charging station 20 of the transfer destination may be determined by using a machine learning model that outputs the charging station 20 of the transfer destination by inputting weather information, power information, vehicle information, and network delay information. Machine learning is performed, for example, by control unit 101. Once the control unit 101 determines the charging station 20 of the transfer destination, it instructs the charging station 20 of the transfer destination to transfer the data. Accordingly, in the charging station 20 of the transfer destination, the processing requested from the vehicle 40 is not executed, and the data related to the processing is transferred. In some embodiments, when determining the charging station 20 of the transfer destination, the weather information may be omitted. For example, by inputting weather information to the machine learning, it is possible to make a more accurate determination based on the amount of power generation in the future, but it is also possible to determine the charging station that is the transfer destination using only the amount of power generation at the present time. In some embodiments, information on power consumption in the charging station 20 at the present time may be omitted.

The control unit 101 may determine the charging station 20 of the transfer destination so that the surplus power is the smallest as a whole of the information processing apparatus 1. Alternatively, the charging station 20 of the transfer destination can be determined so that the process is completed during the charging period of the vehicle 40 and the overall cost of the information processing apparatus 1 is lowest. Further, as an alternative method, the charging station 20 of the transfer destination can be determined so that the response is the fastest. Further, regardless of machine learning or statistical analysis, the charging station 20 having a larger amount of surplus power or the charging station 20 having the largest amount of power supplied may be determined as the charging station 20 of the transfer destination. Further, the charging station 20 having the excess power equal to or greater than the threshold value may be determined as the charging station 20 of the transfer destination. In either case, the control unit 101 determines the charging station 20 to which the process will be completed during the vehicle 40 charging period as the charging station 20 of the transfer destination.

The storage unit 102 comprises a main memory device and an auxiliary memory device. The main memory device is the memory in which the programs executed by the control unit 101 and the data used by said control programs are deployed. The auxiliary storage device is a device in which a program executed by the control unit 101 and data used by the control program are stored. The storage unit 102 stores, for example, a machine learning model or a regression equation that outputs the charging station 20 of the transfer destination by inputting weather information, power information, vehicle information, and network delay information.

The communication unit 103 is a communication interface for connecting the management unit 10 to a network. The communication unit 103 comprises, for example, a network interface board and a wireless communication interface for wireless communication.

The weather server 50 is a server that provides weather information for the area corresponding to the power generation facility 30 according to a request from the management unit 10. The weather server 50 is a computer equipped with a processor, main storage unit, auxiliary storage unit, and a communication unit. The weather server 50 provides information on sunshine and wind speed, current or future.

The vehicle 40 is equipped with a computer with a processor, main storage unit, auxiliary storage unit, and communication unit. These components are interconnected by the CAN bus, an in-vehicle network bus. The communication unit of the vehicle 40 is a device for communicating with the charging station 20. The communication unit is a circuit for performing communication using, for example, LTE (Long Term Evolution), local 5G, Wi-Fi (registered trademark), Bluetooth (registered trademark), NFC (Near Field Communication), UWB (Ultra Wideband), and the like.

Each charging station 20 has an edge 200. In the example shown in FIG. 1, the first charging station 20A has a first edge 200A, the second charging station 20B has a second edge 200B, and the third charging station 20C has a third edge 200C. Edge 200 can be configured as a computer having a processor, main storage unit, auxiliary storage unit, and a communication unit. Edge 200 is an edge device in edge computing. Edge 200 has control unit 201, storage unit 202, and communication unit 203 as functional components. In FIG. 1, the configuration corresponding to the first charging station 20A is denoted by a reference numeral A, the configuration corresponding to the second charging station 20B is denoted by a reference numeral B, and the configuration corresponding to the third charging station 20C is denoted by a reference numeral C. In the following description, if the configuration of any of the charging stations 20 is not distinguished, it will be described without the reference numeral A to C.

The control unit 201 of Edge 200 executes the edge application. The edge application receives the requested processing from vehicle 40 and returns the processing results to vehicle 40. When the control unit 201 receives a command from the management unit 10 to perform processing at another edge 200, it requests processing to another edge 200 and transfers data to it. When the processing result is received from another edge 200, the processing result is transmitted to the vehicle 40. When the control unit 201 receives a request for processing from another edge 200, it executes the processing and returns the processing results.

For updating the firmware of ECUs using OTA (Over The Air), etc., the data downloaded once by the edge 200 may be stored in the storage unit 202, and the next time a request for firmware update is received from another vehicle 40, the data stored in the storage unit 202 may be used to update the firmware. The data may be used to reduce the power and time required for downloading. Alternatively, for example, the update data can be downloaded from another edge 200 that stores the firmware update data. In this case, the data may be retrieved from another edge 200 when this may reduce power and time consumption compared to downloading data from a server that provides firmware update data.

Figure 2:
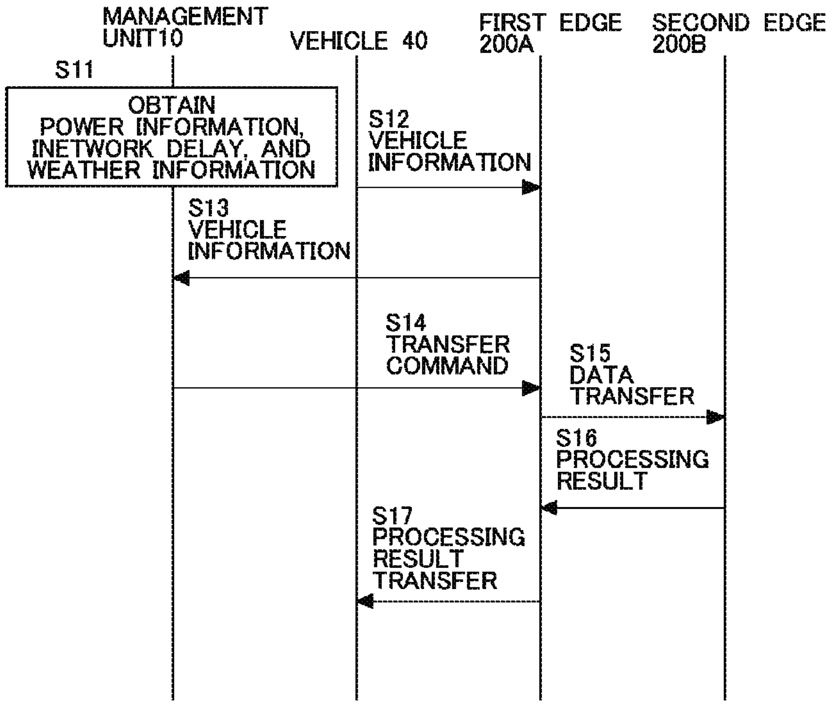
FIG. 2 is a sequence diagram showing the overall process of the information processing apparatus.

Next, the overall process of information processing apparatus 1 is described. FIG. 2 is a sequence diagram showing the overall process of information processing apparatus 1. The vehicle 40 shown in FIG. 2 shall be charged at the first charging station 20A. Both the first charging station 20A and the second charging station 20B receive power from the solar power generation facility 30, but the weather is better at the location of the second power generation facility 30B than at the location of the first power generation facility 30A. In other words, the explanation will be given assuming that the position of the second power generation facility 30B has a higher amount of sunlight and thus generates a higher amount of power. Further, the explanation will be made assuming that a trained machine learning model is stored in the storage unit 102 of the management unit 10.

The management unit 10 obtains power information, information on network delays, and weather information at predetermined time intervals (S11). These information need not be obtained at the same time. When the vehicle 40 starts charging at the first charging station 20A, vehicle information is transmitted from the vehicle 40 to the first edge 200A (S12). Vehicle information includes processing requests, which are requests for information processing. In response to the processing request, vehicle information is sent from the first edge 200A to the management unit 10 (S13). The management unit 10 uses the learned machine learning model to determine the edge 200 to perform the processing requested by the vehicle 40. In the example shown in FIG. 2, the edge 200 to be processed is determined to be the second edge 200B. Then, a command is sent from the management unit 10 to the first edge 200A to transfer data to the second edge 200B (S14). In response to this command, the first edge 200A forwards data on the processing requested by the vehicle 40 to the second edge 200B (S15). In response to this data transfer, processing is performed at the second edge 200B, and the processing results are sent from the second edge 200B to the first edge 200A (S16). The first edge 200A then forwards the processing results to the vehicle 40 (S17).

Figure 3:
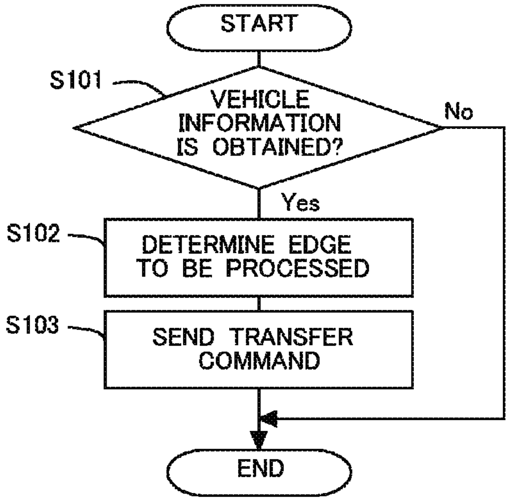
FIG. 3 is a flowchart of the process in the management device for the implementation.

FIG. 3 is a flowchart of the process in the management unit 10 for the embodiment. The process shown in FIG. 3 is executed at predetermined intervals in the management unit 10. It is assumed that the power information, network delay information, and weather information have already been acquired and stored in storage unit 102. The power information, network delay information, and weather information stored in storage unit 102 are periodically updated by control unit 101.

In step S101, the control unit 101 determines whether vehicle information is obtained from edge 200. If a positive judgment is made in step S101, go to step S102; if a negative judgment is made, this routine is terminated. In step S102, the control unit 101 determines the edges to be processed as requested by the vehicle 40. The control unit 101 inputs power information, network delay information, weather information, and vehicle information to the machine learning model to acquire the edge 200 that is optimal for the transfer destination. The most suitable edge 200 for the transfer destination is, for example, an edge 200 such that the processing is completed during the charging period of the vehicle 40 and the surplus power of the information processing apparatus 1 as a whole is the smallest. Then, in step S103, the control unit 101 sends a transfer command to the edge 200 that sent the vehicle information. This transfer command includes a command to transfer data to the edge 200 determined in step S102 and a command to transfer data received from the edge 200 determined in step S102 to the vehicle 40. When the edge 200 determined in step S102 is the same as the edge 200 to which the vehicle information is transmitted, a command to process the data by itself is transmitted.

Figure 4:
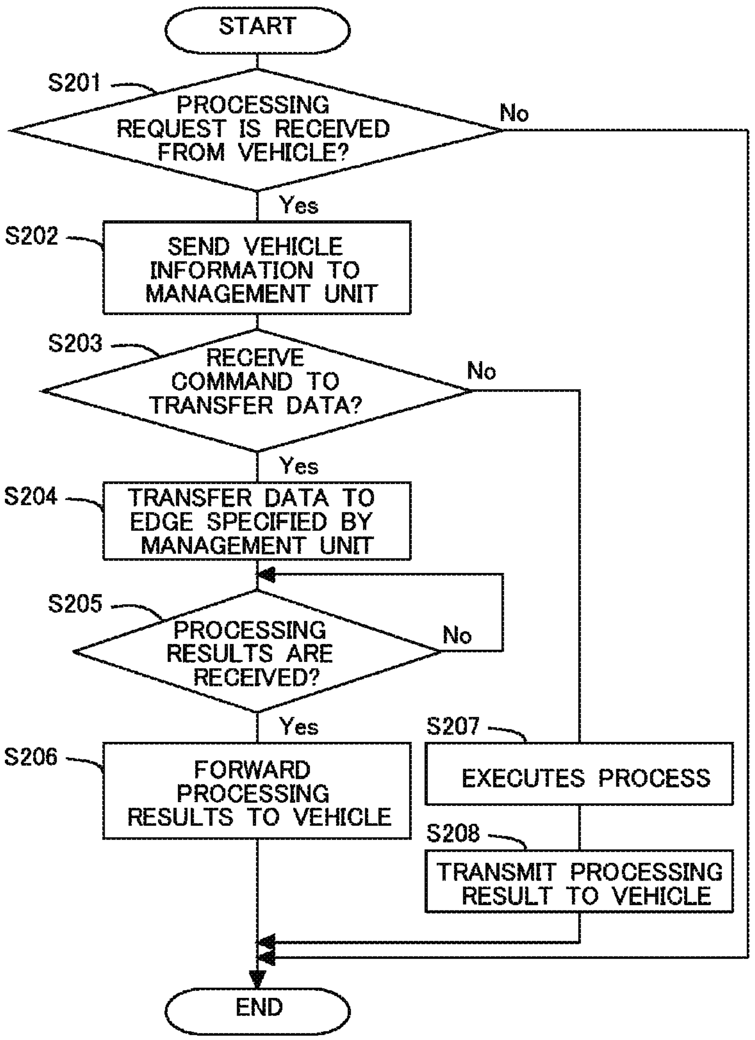
FIG. 4 is a flowchart of the process at the edge of the implementation.

Next, FIG. 4 is a flowchart of processing at the edge 200 according to the embodiment. The process shown in FIG. 4 is executed at predetermined time intervals. The process shown in FIG. 4 is a process at the edge 200 for which the process is requested from the vehicle 40. In step S201, the control unit 201 determines whether a processing request is received from the vehicle 40. If a positive judgment is made in step S201, go to step S202; if a negative judgment is made, this routine is terminated. In step S202, the control unit 201 sends vehicle information to management unit 10. In step S203, the control unit 201 determines whether it has received a command from the management unit 10 to transfer data to another edge 200. If a positive judgment is made in step S203, go to step S204; if a negative judgment is made, go to step S207.

In step S204, the control unit 201 transfers data to the edge 200 specified by the management unit 10. In step S205, the control unit 201 determines whether the processing results are received from the edge 200 that transferred the data. If a positive judgment is made in step S205, go to step S206; if a negative judgment is made, the process of step S205 is executed again. In step S206, the control unit 201 forwards the processing results received in step S205 to vehicle 40.

On the other hand, in step S207, the control unit 201 executes the process requested by the vehicle 40 by itself. In other words, data is not transferred to another edge 200, but is processed by the control unit 201 itself. In step S208, the control unit 201 transmits the processing results to the vehicle 40.

Figure 5:
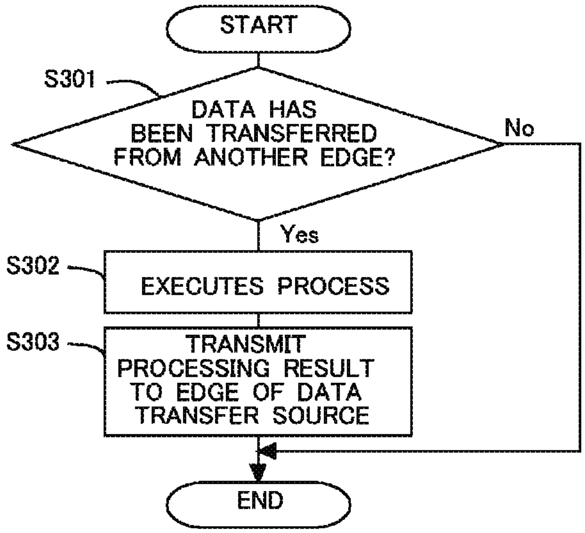
FIG. 5 is a flowchart of the process at the edge of the implementation.

Next, FIG. 5 is a flowchart of processing at the edge 200 according to the embodiment. The process shown in FIG. 5 is executed at predetermined time intervals. The process shown in FIG. 5 is the process at edge 200 where the data was transferred. In step S301, the control unit 201 determines whether data has been transferred from another edge 200. If a positive judgment is made in step S301, go to step S302; if a negative judgment is made, this routine is terminated. In step S302, the control unit 201 executes the process requested by vehicle 40. For example, if an ECU firmware update using OTA is requested, the update data is downloaded from a server that provides update data. Then, in step S303, the control unit 201 transmits the processing result to another edge 200 that is the data transfer source. At this time, for example, ECU firmware update data using OTA is transmitted.

As explained above, according to this embodiment, the processing requested by the vehicle 40 can be performed at the charging station 20 where surplus power is likely to be generated, thereby reducing the surplus power that is disposed of. In other words, power consumption can be reduced because the charging station 20 from which the data is transferred only transfer the data and do not perform the requested processing. At the charging station 20 at the transfer destination, excess power is consumed, thus reducing the amount of energy that is discarded. In addition, by incorporating weather information, it is possible to implement a forecasting algorithm that takes into account future power generation. Furthermore, by accounting for network delays, the process can be completed during the vehicle 40 charging period.

OTHER EMBODIMENTS

The above-described embodiment and modification are merely examples, but the present disclosure can be implemented with appropriate modifications without departing from the spirit thereof. The processing and/or structure (devices, units, parts, etc.) described in the present disclosure can be freely combined and implemented as long as no technical contradiction occurs. In addition, the processing described as being performed by a single device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner.

The present disclosure can also be realized by supplying to a computer a computer program in which the functions described in the above-described embodiment or modification are implemented, and reading out and executing the program by one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising a controller configured to:

acquire information related to a process requested from a vehicle to be charged at a first charging station among a plurality of charging stations;

acquire information related to an amount of power generation using renewable energy in a plurality of power generation facilities assigned to the plurality of charging stations;

acquire information related to a delay of a network between the plurality of charging stations, determine, among the plurality of charging stations, a second charging station which is a charging station in which the process requested from the vehicle is completed during a charging period of the vehicle, and in which an excess power in the plurality of power generation facilities is smaller than that in a case where the process requested from the vehicle is performed in the first charging station, based on information related to the process requested from the vehicle, information related to an amount of power generation, and information related to the delay of the network; and instruct the first charging station to transmit information related to the process requested from the vehicle to the second charging station.

2. The information processing apparatus according to claim 1, further comprising:

a memory configured to store a machine learning model that outputs information related to the second charging station when information related to the process requested from the vehicle, information related to an amount of power generation, and information related to the delay of the network are input, wherein the controller is configured to acquire information related to the second charging station by inputting, to the machine learning model, information related to the process requested from the vehicle, information related to an amount of power generation, and information related to the delay of the network.

3. The information processing apparatus according to claim 1, wherein the controller is configured to:

acquire weather information corresponding to the plurality of power generation facilities from a server that provides the weather information; and determine the second charging station further in accordance with the weather information.

4. The information processing apparatus according to claim 1, wherein the controller is configured to determine the second charging station such that a surplus electric power is minimized.

5. The information processing apparatus according to claim 1, wherein the controller is configured to acquire a power consumption according to a load amount of the process requested from the vehicle as information related to the process requested from the vehicle.

* * * * *